United States Patent
Nakata et al.

(10) Patent No.: US 10,654,279 B2
(45) Date of Patent: May 19, 2020

(54) INK TANK AND INK JET RECORDING APPARATUS

(71) Applicant: CANON KABUSHIKI KAISHA, Tokyo (JP)

(72) Inventors: Eiichi Nakata, Kawasaki (JP); Taro Endo, Kawasaki (JP); Maki Motomura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/155,992

(22) Filed: Oct. 10, 2018

(65) Prior Publication Data
US 2019/0111691 A1    Apr. 18, 2019

(30) Foreign Application Priority Data

Oct. 17, 2017  (JP) ................................ 2017-200731
Sep. 26, 2018  (JP) ................................ 2018-179947

(51) Int. Cl.
*B41J 2/175*  (2006.01)
*B29K 509/08*  (2006.01)
(Continued)

(52) U.S. Cl.
CPC ....... *B41J 2/17513* (2013.01); *B41J 2/17556* (2013.01); *B41J 2/17559* (2013.01); *B29C 49/0005* (2013.01); *B29K 2023/06* (2013.01); *B29K 2023/12* (2013.01); *B29K 2509/08* (2013.01); *B29L 2031/712* (2013.01); *B41J 2002/17516* (2013.01)

(58) Field of Classification Search
CPC .... B41J 2002/17516; B41J 2002/17586; B41J 2/17503; B41J 2/17513; B65D 83/0055; B65D 83/0061; B65D 83/0066
See application file for complete search history.

(56) References Cited

U.S. PATENT DOCUMENTS

| | | | |
|---|---|---|---|
| 5,975,330 A * | 11/1999 | Sasaki | B41J 2/17523 220/23.91 |
| 2013/0335481 A1* | 12/2013 | Jo | B41J 2/17503 347/36 |
| 2018/0258300 A1* | 9/2018 | Miyake | C09D 11/324 |

FOREIGN PATENT DOCUMENTS

| | | | |
|---|---|---|---|
| JP | 2003-226023 | 8/2003 | |
| JP | 2009-226809 | 10/2009 | |
| JP | 2018145379 A * | 9/2018 | ......... B41J 2/17509 |

OTHER PUBLICATIONS

U.S. Appl. No. 16/156,255, Maki Motomura, filed Oct. 10, 2018.

* cited by examiner

*Primary Examiner* — Scott A Richmond
(74) *Attorney, Agent, or Firm* — Venable LLP

(57) ABSTRACT

An ink tank is used for an ink jet recording apparatus and includes an ink storage bag storing an ink, and the ink storage bag has no mechanism for allowing a side wall portion to shrink into a preliminary defined shape but has a side wall portion to shrink as the ink flows out. The ink tank has no mechanism for adjusting the pressure in the ink storage bag, the ink storage bag is made from a polyolefin resin, the ink is an aqueous ink containing a coloring material and a resin, and the resin contained in the ink has a glass transition temperature higher than the glass transition temperature of the polyolefin resin constituting the ink storage bag. An ink jet recording apparatus includes the ink tank and a recording head that eject an ink supplied from the ink tank by an ink jet method.

18 Claims, 7 Drawing Sheets

(51) Int. Cl.
*B29K 23/00* (2006.01)
*B29C 49/00* (2006.01)
*B29L 31/00* (2006.01)

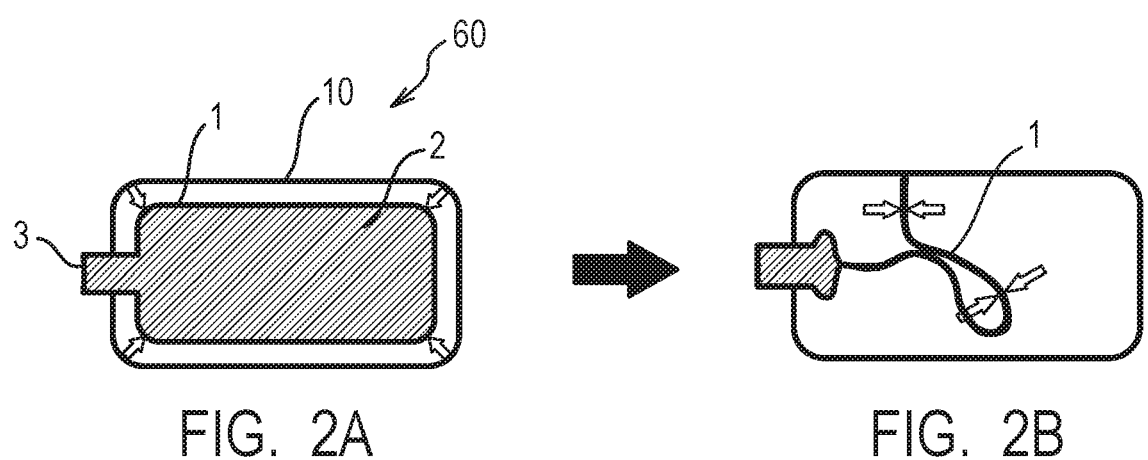

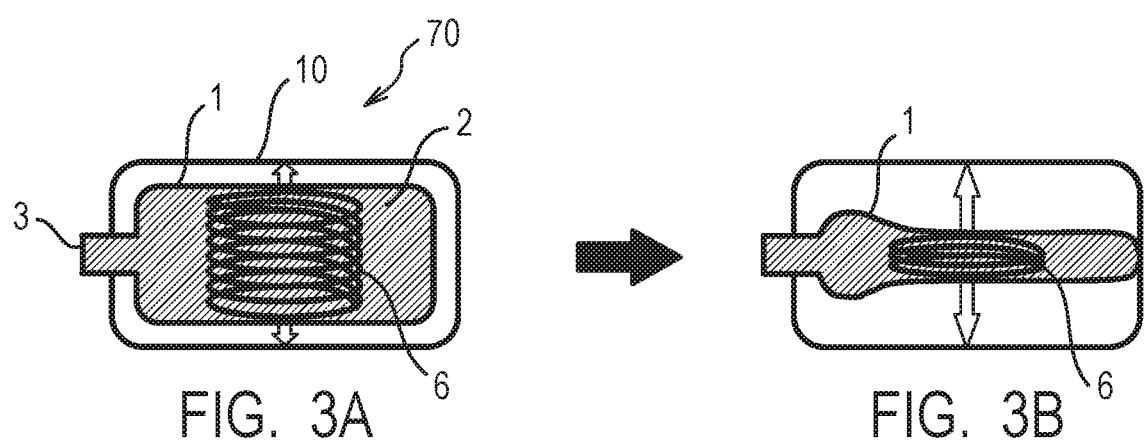

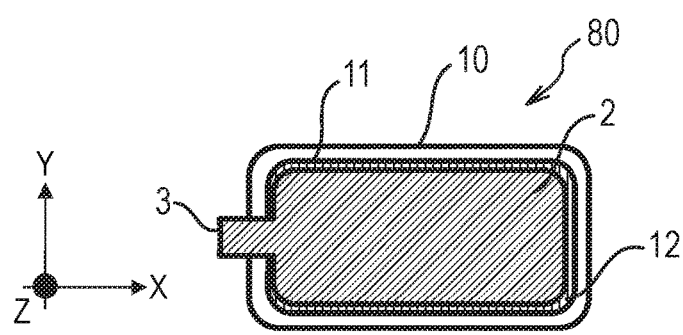
FIG. 4A1
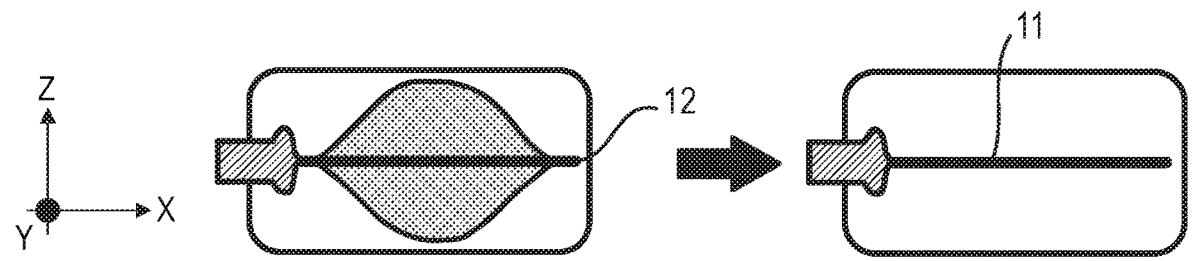
FIG. 4A2   FIG. 4B

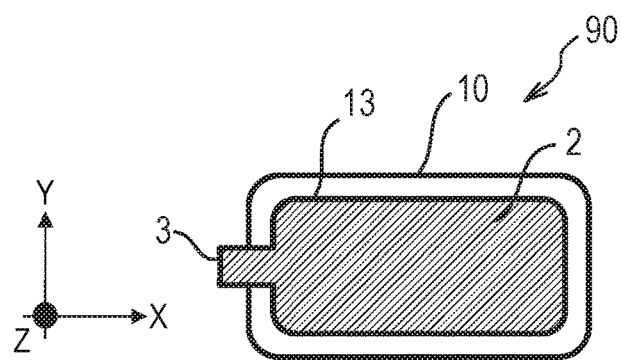
FIG. 5A1
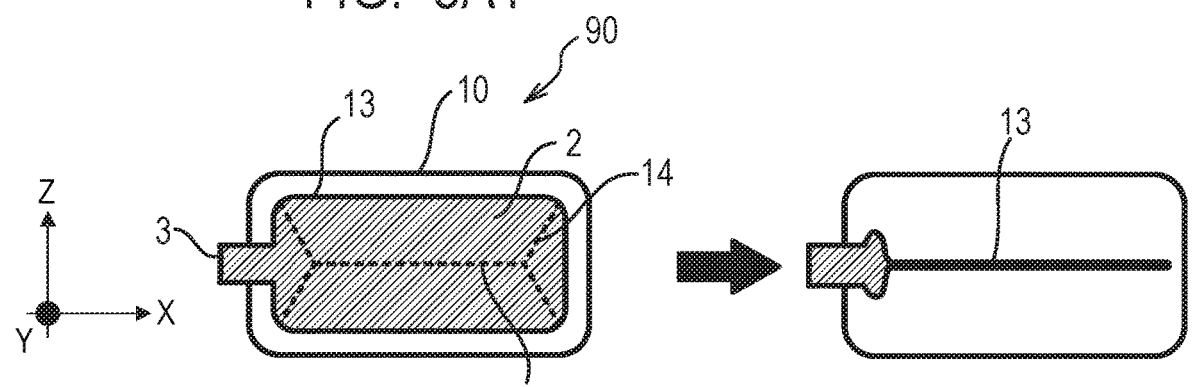
FIG. 5A2
FIG. 5B

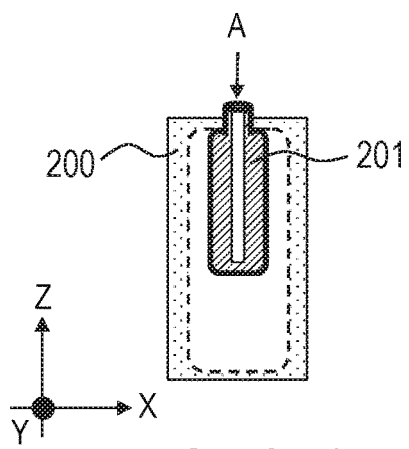
FIG. 6A1
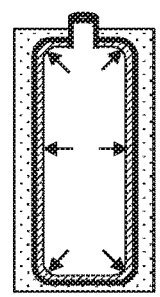
FIG. 6B1
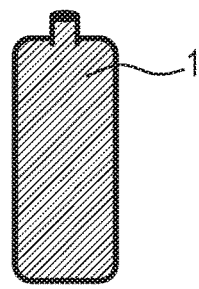
FIG. 6C1
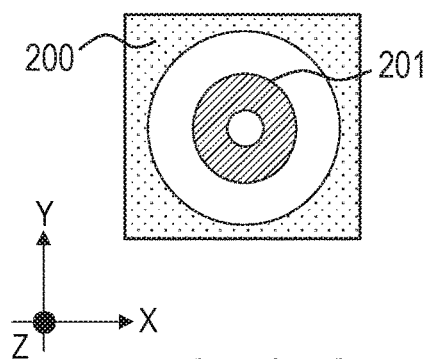
FIG. 6A2
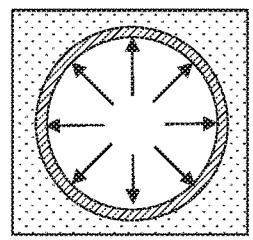
FIG. 6B2
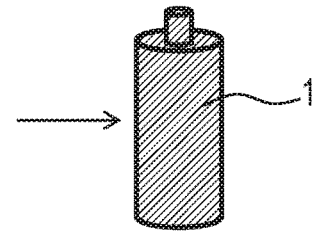
FIG. 6C2
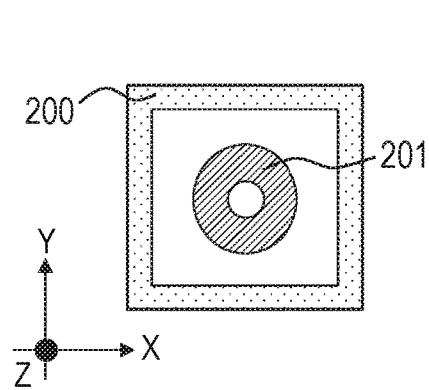
FIG. 6A3
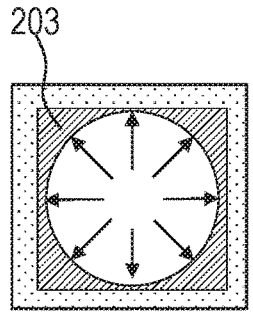
FIG. 6B3
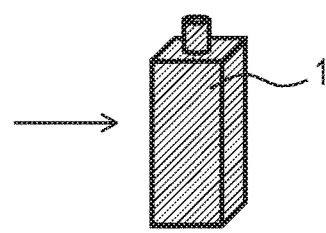
FIG. 6C3

INK TANK AND INK JET RECORDING APPARATUS

BACKGROUND OF THE INVENTION

Field of the Invention

The present invention relates to an ink tank and an ink jet recording apparatus.

Description of the Related Art

Ink tanks used in ink jet recording apparatuses include an ink tank having an ink storage bag made from a resin, which can store a large amount of an ink. The ink tank having an ink storage bag has such a problem as ink use-up property. When an ink is supplied through an ink supply port of an ink tank to a recording head of an ink jet recording apparatus, an ink storage bag shrinks as the ink is supplied (flows out), and the bag collapses irregularly. The force allowing an ink storage bag to shrink and collapse is commonly only a force allowing an ink to flow out.

When an ink jet recording apparatus is used to record images, such an amount of an ink as to be used for recording is supplied from an ink storage bag to a recording head. Even when a large number of images are recorded at once, the amount of an ink supplied to a recording head is still small as compared with the total amount of the ink that can be stored in the ink storage bag, and thus the force allowing the ink to flow out from the ink storage bag is extremely small. The ink storage bag containing a smaller amount of the ink shrinks and collapses and is partially obstructed. Hence, an extremely small force allowing an ink to flow out is insufficient to discharge the ink in the ink storage bag, and it is difficult to use up the ink. This causes problems including low ink use-up property.

To solve such a problem, for example, an ink storage bag having an external pressure applying mechanism such as a spring and an elastic member to push out an ink has been disclosed (Japanese Patent Application Laid-Open No. 2003-226023). This ink storage bag is prepared by bonding margins of two films and is processed in such a way as to collapse in a direction parallel with the bonding face. Another ink storage bag that is controlled to collapse in a particular direction has been disclosed (Japanese Patent Application Laid-Open No. 2009-226809). This ink storage bag has creases that help the bag collapse in a particular direction.

However, providing a mechanism for adjusting the pressure in an ink storage bag or forming a shape for controlling a collapsing or creasing manner of an ink storage bag may have disadvantages in production efficiency, an installation space, a complicated structure and costs. For example, if the mechanism for adjusting the pressure in an ink storage bag is not provided, the ink tank has a simple structure. If the creasing process or the bonding process is not performed but an ink storage bag is produced by blow molding or the like, such an ink storage bag has advantages in production efficiency and costs. However, when the mechanism for adjusting the pressure in an ink storage bag is not provided or the mechanism for controlling the shrinkage of an ink storage bag is not provided, the ink storage bag irregularly collapses as an ink flows out, as mentioned above, and this makes it difficult to completely use up an ink. In addition, ink jet recording apparatuses are intended to be used in various regions, thus are required to be stably operable in a wide range of temperatures, and are preferably designed to be usable at extreme temperatures. Hence, to design an ink jet recording apparatus, various performances are evaluated while the temperature is changed. Studies by the inventors of the present invention have revealed that the ink use-up property may further deteriorate depending on the temperature environment of an ink tank.

An object of the present invention is to provide an ink tank having a simple structure but having excellent ink use-up property. Another object of the present invention is to provide an ink jet recording apparatus including the ink tank.

SUMMARY OF THE INVENTION

In other words, an ink tank according to the present invention is used for an ink jet recording apparatus and includes an ink storage bag storing an ink therein, and the ink storage bag has no mechanism for allowing a side wall portion to shrink into a preliminary defined shape but has a side wall portion to shrink as the ink flows out. The ink tank has no mechanism for adjusting a pressure in the ink storage bag, the ink storage bag is made from a polyolefin resin, the ink is an aqueous ink containing a coloring material and a resin, and the resin contained in the ink has a glass transition temperature higher than a glass transition temperature of the polyolefin resin constituting the ink storage bag.

An ink tank according to the present invention has a simple structure but has excellent ink use-up property. An ink jet recording apparatus according to the present invention includes the ink tank.

Further features of the present invention will become apparent from the following description of exemplary embodiments with reference to the attached drawings.

BRIEF DESCRIPTION OF THE DRAWINGS

FIGS. 2A and 2B are schematic views showing an example of the ink tank.

FIGS. 3A and 3B are schematic views showing another example of the ink tank.

FIGS. 4A1, 4A2 and 4B are schematic views showing another example of the ink tank.

FIGS. 5A1, 5A2 and 5B are schematic views showing another example of the ink tank.

FIGS. 6A1, 6A2, 6A3, 6B1, 6B2, 6B3, 6C1, 6C2 and 6C3 are schematic views showing production processes of ink storage bags by blow molding.

DESCRIPTION OF THE EMBODIMENTS

Figure 1A:
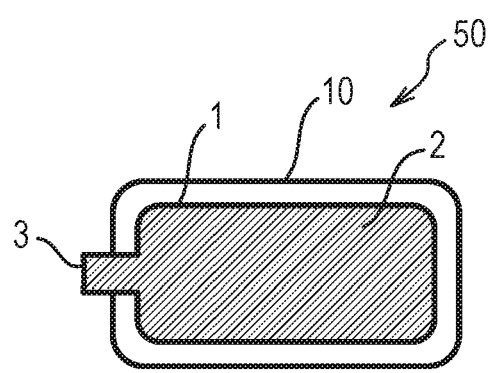
FIGS. 1A, 1B and 1C are schematic views showing an embodiment of an ink tank of the present invention.

Preferred embodiments of the present invention will now be described in detail in accordance with the accompanying drawings.

The present invention will now be described in detail with reference to preferred embodiments. In the present invention, when a compound is a salt, the salt dissociates into ions in an ink, but such a case is expressed as "containing a salt" for convenience. An aqueous ink for inkjet may be simply called "ink". Physical property values are determined at normal temperature (25° C.) at normal pressure (1 atm) unless otherwise noted.

The inventors of the present invention have studied the ink use-up property of an ink tank including an ink storage bag that stores an ink containing a resin. The result has revealed that when the ink tank is placed in both temperature environments at a high temperature and a low temperature, the ink use-up property is likely to deteriorate (an ink is not completely used). For example, when a container without any apparatus for temperature control is used to transport ink tanks by railroads, trucks or the like, the ink tanks may be in a high temperature environment around 50° C. or a low temperature environment around −20° C. Properties of ink tanks and inks are required to be so designed as to withstand such severe temperature changes.

For ink tanks, an ink storage bag made from a polyolefin resin may be used from the viewpoint of flexibility and strength. When an ink tank including such an ink storage bag is placed in a high temperature environment, thermal motion of molecular chains constituting the polyolefin resin increases. The polyolefin resin contains many crystallized portions in which molecular chains come close to each other. An ink storage bag made from a polyolefin resin, which contains many crystallized portions as above, exhibits a certain strength. Typically, polyethylene has a crystallinity of about 60% to 90%, and polypropylene has a crystallinity of about 40% to 70%.

When the thermal motion of molecular chains constituting a polyolefin resin becomes more active, the molecular chains close to each other are separated to reduce the crystallinity of the polyolefin resin, and the resin is softened. A part of a liquid component in an ink that is in contact with an ink storage bag including the softened polyolefin resin permeates from the inner face of the softened polyolefin resin into the inside thereof. When the ink tank is placed in a high temperature environment and successively in a low temperature environment, the thermal motion of molecular chains of the polyolefin resin becomes less active, then the molecular chains come close to each other, and the polyolefin resin shrinks. At this shrinkage, a large part of the liquid component that have permeated into the polyolefin resin flows back, but a part of the liquid component remains in the polyolefin resin. As a result, an ink storage bag after storage in an environment with large temperature variations is slightly softened as compared with an ink storage bag before storage in the environment with large temperature variations.

The inventors of the present invention have found that especially when an ink tank including an ink storage bag that is made from a polyolefin resin and stores an ink containing a resin is placed in an environment with large temperature variations, the ink storage bag is more likely to be softened. The case in which an ink tank including the ink storage bag that is made from a polyolefin resin and stores an ink containing a resin is stored in a high temperature environment will be supposed. In this case, not only a liquid component but also the resin in the ink permeates into the polyolefin resin constituting the ink storage bag. When the ink tank is placed in a high temperature environment and successively in a low temperature environment, a large part of the liquid component flows back as the polyolefin resin shrinks, but the resin, which has a comparatively large molecular size, is likely to remain in the polyolefin resin. As a result, the resin that is derived from the ink and is incorporated among molecular chains of the polyolefin resin constituting the ink storage bag interferes with crystallization of the polyolefin resin to reduce the crystallinity, and thus the ink storage bag is supposed to be likely to be softened. As the ink is supplied, the side wall portion of the softened ink storage bag irregularly shrinks and collapses while softened portions are likely to adhere, causing partial obstruction. It is supposed that many obstructed portions are consequently formed in the ink storage bag to reduce the ink use-up property.

In such circumstances, the inventors of the present invention have focused on properties of the resin contained in an ink and have further studied to improve the ink use-up property. As a result, the inventors have found that use of an ink containing a resin having a glass transition temperature higher than the glass transition temperature of a polyolefin resin constituting an ink storage bag enables an improvement of the ink use-up property. A resin having a glass transition temperature higher than that of a polyolefin resin constituting an ink storage bag is unlikely to interfere with the crystallization of the polyolefin resin even when remaining in the polyolefin resin, and thus such a resin is supposed to suppress softening of the ink storage bag.

<Ink Tank>

An ink tank of the present invention includes an ink storage bag storing an ink therein and is used in an ink jet recording apparatus. The ink storage bag has no mechanism for allowing a side wall portion to shrink into a preliminary defined shape, such as creasing processing. The ink tank of the present invention has no mechanism for adjusting the pressure in the ink storage bag. In other words, the ink storage bag included in the ink tank of the present invention is a bag-shaped member having a side wall portion that can irregularly shrink as the ink flows out. The ink storage bag is made from a polyolefin resin, and the ink is an aqueous ink containing a coloring material and a resin. The resin contained in the ink has a glass transition temperature higher than the glass transition temperature of the polyolefin resin constituting the ink storage bag. The ink tank of the present invention will now be described in detail.

(Ink Storage Bag)

Figure 1B:
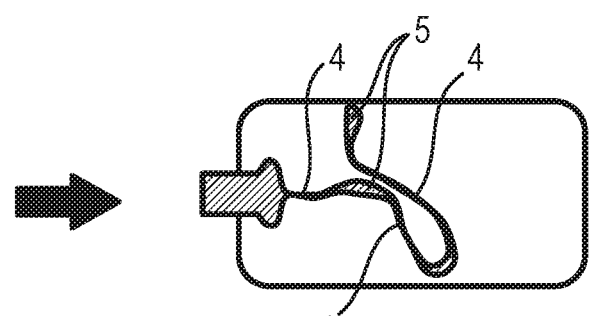
Figure 1C:
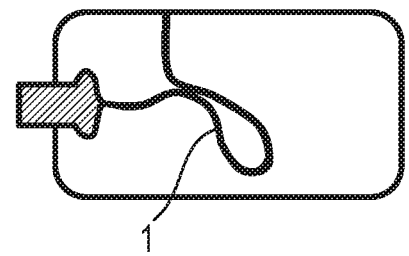

FIGS. 1A to 1C are schematic views showing an embodiment of the ink tank of the present invention. An ink tank 50 in the embodiment shown in FIG. 1A includes a housing 10 and an ink storage bag 1 that is placed in the housing 10 and stores an ink 2. The ink 2 stored in the ink storage bag 1 flows out of the ink 2 through an ink supply port 3 and is supplied to a recording head of an ink jet recording apparatus communicating with the ink supply port 3. The ink tank 50 in the embodiment has no mechanism for adjusting the pressure in the ink storage bag 1. The ink storage bag 1 included in the ink tank 50 has no mechanism for allowing a side wall portion to shrink into a preliminary defined shape. Hence, when the ink 2 in the ink storage bag 1 flows out through the ink supply port 3, the side wall portion of the ink storage bag 1 shrinks and irregularly collapses as the ink 2 flows out, as shown in FIG. 1B and FIG. 1C. The side wall portion of the ink storage bag 1 means a "side portion" where the ink supply port 3 faces upward in the gravity direction. When the side wall portion of the ink storage bag 1 shrinks and irregularly collapses, inner faces facing each other on the side wall portion of the ink storage bag 1 come closer. However, the ink 2 contains a resin having a comparatively high glass transition temperature, and thus the inner faces coming closer of the ink storage bag 1 are prevented from adhering. Accordingly, the ink 2 in the ink storage bag 1 can be used up without waste (FIG. 1C). Even when obstructed portions 4 are partially formed in the ink storage bag 1, the amount of a remaining ink 5 can be as small as possible (FIG. 1B), and the ink use-up property can be improved. As described above, the present invention is intended to suppress the reduction of the use-up property by adhesion of inner faces, and thus the "base part" that does not cause such a problem as use-up property reduction by adhesion is not included in the "side wall portion".

Meanwhile, the case of an ink tank 60 having a mechanism for adjusting the pressure in an ink storage bag will be supposed. As shown in FIG. 2A, a pressure (positive pressure) is applied to an ink storage bag 1 in such a direction that a side wall portion of the ink storage bag 1 shrinks. In the case of the ink tank 60, even when the remaining amount of an ink 2 becomes small, the side wall portion of the ink storage bag 1 shrinks and collapses (FIG. 2B). Hence, the ink 2 can be used up. The case of an ink tank 70 having, in an ink storage bag 1, a spring 6 that is a mechanism for adjusting the pressure in an ink storage bag will be supposed. As shown in FIG. 3A, a pressure (negative pressure) is applied to the ink storage bag 1 in such a direction that the ink storage bag 1 expands. In the case of the ink tank 70, a negative pressure applied with the spring 6 prevents obstruction, and thus no obstructed portion is formed in the ink storage bag 1. Hence, the ink can be used up without waste as shown in FIG. 3B.

The case of an ink tank 80 including an ink storage bag 11 having a connector 12 that is a mechanism for allowing a side wall portion to shrink into a preliminary defined shape as shown in FIGS. 4A1, 4A2 and 4B will be supposed. FIG. 4A1 is a front view of the face with the connector 12 and FIG. 4A2 is a side view of the face with the connector 12. In the case of the ink tank 80, when an ink 2 flows out of the ink storage bag 11, the side wall portion of the ink storage bag 11 shrinks into a preliminary defined shape (FIG. 4B). Hence, the ink can be used up without waste.

The case of an ink tank 90 including an ink storage bag 13 having creases 14 that are a mechanism for allowing a side wall portion to shrink into a preliminary defined shape as shown in FIGS. 5A1, 5A2 and 5B will be supposed. FIGS. 5A1 and 5A2 are views viewed in the same directions as in FIGS. 4A1 and 4A2. In the case of the ink tank 90, when an ink 2 flows out of the ink storage bag 13, the ink storage bag 13 deforms along the creases 14, and the side wall portion shrinks into a preliminary defined shape (FIG. 5B). Hence, the ink can be used up without waste.

The ink storage bag included in the ink tank of the present invention is made from a polyolefin resin such as polyethylene and polypropylene. The polyolefin resin may be a mixture of a plurality of polyolefins or may be a modified polyolefin, for example. Specifically, a polyethylene resin is preferably used. A composition of the polyolefin resin constituting the ink storage bag may contain a glass filler, a pigment filler, a mineral filler or a similar filler.

The glass transition temperature of the resin contained in the ink is higher than the glass transition temperature of the polyolefin resin constituting the ink storage bag, and is preferably higher by 5° C. or more. The difference between the glass transition temperature of the resin contained in the ink and the glass transition temperature of the polyolefin resin constituting the ink storage bag is preferably 300° C. or less and more preferably 200° C. or less. The glass transition temperature of the polyolefin resin is preferably −150° C. or more to 50° C. or less.

The difference between the average SP of the resin contained in the ink and the SP of the polyolefin resin constituting the ink storage bag is preferably 2.0 $(cal/cm^3)^{1/2}$ or more. The difference between the average SP of the resin contained in the ink and the SP of the polyolefin resin constituting the ink storage bag is preferably 10.0 $(cal/cm^3)^{1/2}$ or less and more preferably 5.0 $(cal/cm^3)^{1/2}$ or less. The SP of the polyolefin resin is preferably 5.0 $(cal/cm^3)^{1/2}$ or more to 10.0 $(cal/cm^3)^{1/2}$ or less.

The SP ($\delta$) in the present invention is calculated by Fedors method in accordance with Expression (1). $\Delta E_{vap}$ and V of a resin can be determined with reference to the description in Coating Jiho, No. 193 (1992), for example.

$$\delta = \sqrt{\frac{\Delta E_{vap}}{V}} \quad (1)$$

(In Expression (1), $\Delta E_{vap}$ is the molar heat of vaporization (cal/mol) of a compound, and V is the molar volume (cc/mol) of a compound at 25° C.)

Properties of the polyolefin resin constituting the ink storage bag can be determined by the following methods. An ink storage bag is cut out into an appropriate size as a measurement sample, and the sample is analyzed by pyrolysis gas chromatography/mass analysis (Py-GC/MS). This analysis reveals the unit type (polyethylene, polypropylene, a polyolefin including a plurality of units or the like) of the resin constituting the ink storage bag. From the determined unit type and chemical shifts of nuclear magnetic resonance (NMR), the composition ratio of units can be determined. The glass transition temperature of the polyolefin resin constituting an ink storage bag can be determined by analysis of a similar measurement sample to the above, using a differential scanning calorimeter (DSC). The SP of the polyolefin resin constituting an ink storage bag can be determined from the resin units and the composition ratio determined as above, in accordance with Expression (1) by Fedors method.

The ink storage bag included in the ink tank of the present invention preferably has an elastic modulus of 500 N/mm² or less. An ink storage bag having an elastic modulus of 500 N/mm² or less is fairly soft as compared with that used in a typical ink tank for ink jet. When the ink in an ink tank is used, a side wall portion of a soft ink storage bag spontaneously shrinks without a mechanism for allowing the ink storage bag to shrink, and the ink can be allowed to flow out. The ink storage bag preferably has an elastic modulus of 50 N/mm² or more. To satisfy such an elastic modulus as above, an ink storage bag made from a single layer of a polyolefin resin is preferably used.

The elastic modulus of an ink storage bag is determined in accordance with JIS-K-7127 or JIS-K-7161. The measurement is performed by using a tension tester in the following conditions: test mode: tension; displacement speed: 5 mm/min (a sample is displaced until the yield point is observed); sample dimensions: 150 mm in length, 25 mm in width and 1 mm or less in thickness; and chuck distance: 100 mm. The measurement is performed in such conditions, and the elastic modulus is determined from the X-Y gradient in a region in which the X-Y relation is linear, where X is test force and Y is sample displacement, or in the region before the yield point is observed.

For conventional ink tanks, an ink storage bag having a multilayer structure including a plurality of bonded films or an ink storage bag including a resin film on which a metal such as aluminum is deposited has been used in consideration of barrier property. Such an ink storage bag has an elastic modulus much larger than 500 N/mm² and have satisfactory barrier property but is not soft. To allow an ink to flow out of such a bag, any measures are needed. The ink tanks that are disclosed in Japanese Patent Application Laid-Open No. 2003-226023 and Japanese Patent Application Laid-Open No. 2009-226809 and may be made from a hard material therefore include an ink storage bag processed to have creases, bonded margins or the like or include a mechanism for adjusting the inner pressure in order to allow an ink to smoothly flow out.

The ink storage bag preferably has a cylindrical shape. The inventors of the present invention have studied the ink use-up property of a cylindrical-shaped ink storage bag and a prismatic-shaped ink storage bag and have found that the cylindrical-shaped ink storage bag gives better results. The cylindrical-shaped ink storage bag is likely to have a side wall portion with a uniform thickness at the time of molding, and thus the ink storage bag is likely to collapse isotropically as an ink flows out. In contrast, the prismatic-shaped ink storage bag is unlikely to have a side wall portion with a uniform thickness at the time of molding as compared with the cylindrical-shaped ink storage bag, and accordingly, the prismatic-shaped ink storage bag is likely to collapse non-uniformly as an ink flows out. The ink is thus likely to stay in an obstructed space, and the ink use-up property may deteriorate.

The ink capacity of the ink storage bag can be appropriately set depending on the size of an ink jet recording apparatus, replacement frequency after use-up or the like. Specifically, the ink capacity of the ink storage bag is preferably 100 mL or more to 1,000 mL or less and more preferably 200 mL or more to 800 mL or less. The size of the ink storage bag can be appropriately set depending on the size of an ink jet recording apparatus, ink capacity or the like. Specifically, the bag portion except the ink supply port preferably has a base area of 10 to 100 cm$^2$ and a height of 10 to 30 cm.

The ink storage bag is preferably produced by blow molding or the like from the viewpoint of production efficiency and costs. FIGS. 6A1 to 6C3 are schematic views showing production processes of ink storage bags by blow molding. FIGS. 6A1, 6B1 and 6C1 are schematic views of an ink storage bag 1 viewed from the side wall direction. First, a melted polyolefin resin as the raw material of an ink storage bag is extruded in a mold 200 to form a pipe-shaped parison 201 (FIG. 6A1). Next, into the parison 201, gas is supplied in the direction of arrow A, and the blown parison 201 is allowed to push in arrow directions or against the inner wall of the mold 200 (FIG. 6B1). The parison 201 is cooled to give a hollow ink storage bag 1 having a shape reproducing the inner shape of the mold 200 (FIG. 6C1).

FIGS. 6A2, 6B2 and 6C2 are schematic sectional views of an ink storage bag 1 when a cylindrical-shaped ink storage bag 1 is produced, and correspond to FIGS. 6A1, 6B1 and 6C1, respectively. Similar as FIGS. 6A1, 6B1 and 6C1, first, a melted resin is extruded in a mold 200 to form a parison 201 (FIG. 6A2). Next, gas is supplied into the parison 201 and the blown parison 201 is allowed to push in arrow directions or against the inner wall of the mold 200 (FIG. 6B2). The parison 201 is cooled to give a hollow ink storage bag 1 having a cylindrical-shape reproducing the inner shape of the mold 200 (FIG. 6C2).

FIGS. 6A3, 6B3 and 6C3 are schematic sectional views of an ink storage bag 1 when a prismatic-shaped ink storage bag 1 is produced, and correspond to FIGS. 6A1, 6B1 and 6C1, respectively. Similar as FIGS. 6A1, 6B1 and 6C1, first, a melted resin is extruded in a mold 200 to form a parison 201 (FIG. 6A3). Next, gas is supplied into the parison 201 and the blown parison 201 is allowed to push in arrow directions or against the inner wall of the mold 200 (FIG. 6B3). The parison 201 is cooled to give a hollow ink storage bag 1 having a prismatic-shape reproducing the inner shape of the mold 200 (FIG. 6C3). As described above, a cylindrical-shaped ink storage bag is preferably used in the present invention. This is because a prismatic-shaped ink storage bag 1 has, on the side wall, such thicker portions than the other portions as corner portions 203 in FIG. 6B3 and thus is unlikely to have a side wall portion with a uniform thickness.

The ink storage bag is stored in a housing having an appropriate rigidity, for example. Examples of the material of the housing include thermoplastic resins such as polyesters, polycarbonates, polyolefins (including polyethylene and polypropylene) and polyphenylene ethers; and mixtures and modified products of such thermoplastic resins. The housing preferably has a similar shape to the shape of the ink storage bag. The housing preferably has an air communicating port in order to take air from the outside as the ink storage bag in the housing shrinks and to maintain the pressure in the housing equivalent to the atmospheric pressure.

(Ink)

The ink stored in the ink storage bag in the ink tank of the present invention is an aqueous ink for ink jet containing a coloring material and a resin. The resin contained in the ink has a glass transition temperature higher than the glass transition temperature of the polyolefin resin constituting the ink storage bag. The ink used in the recording method of the present invention is not necessarily what is called a "curable ink". Hence, the ink used in the present invention does not necessarily contain such a compound as a polymerizable monomer that is polymerizable by application of external energy. Components constituting the ink and physical properties of the ink will next be described in detail.

[Coloring Material]

As the coloring material, a pigment or a dye can be used. The content (% by mass) of the coloring material in the ink is preferably 0.50% by mass or more to 15.00% by mass or less and more preferably 1.00% by mass or more to 10.00% by mass or less based on the total mass of the ink.

Specific examples of the pigment include inorganic pigments such as carbon black and titanium oxide; and organic pigments such as azo pigments, phthalocyanine pigments, quinacridone pigments, isoindolinone pigments, imidazolone pigments, diketopyrrolopyrrole pigments and dioxazine pigments.

In terms of the dispersion manner of a pigment, a resin-dispersed pigment containing a resin as a dispersant or a self-dispersible pigment in which the particle surface of a pigment is bonded to a hydrophilic group can be included. In addition, a resin-bonded pigment in which the particle surface of a pigment is chemically bonded to an organic group containing a resin or a microcapsule pigment in which the particle surface of a pigment is covered with or encapsulated in a resin or the like can also be used, for example. When a pigment is used as the coloring material, a self-dispersible pigment or a resin-dispersed pigment dispersed by a resin dispersant that is physically adsorbed onto the particle surface of a pigment (i.e., a resin-dispersed pigment except resin-bonded pigments and microcapsule pigments) is preferred.

As the resin dispersant for dispersing a pigment in an aqueous medium, a dispersant having an anionic group that enables a pigment to be dispersed in an aqueous medium is preferably used. As the resin dispersant, such resins as described later, specifically water-soluble resins can be used. In the ink, the mass ratio of the content (% by mass) of the pigment relative to the content (% by mass) of the resin dispersant is preferably 0.3 times or more to 10.0 times or less.

As the self-dispersible pigment, a pigment in which an anionic group such as a carboxylic acid group, a sulfonic acid group and a phosphonic acid group is bonded directly or through an additional atomic group (—R—) to the particle surface of the pigment can be used. The anionic group may be either an acid form or a salt form. An anionic group in a salt form may dissociate partly or completely. Examples of the cation as the counter ion of an anionic group in a salt form include alkali metal cations, ammonium and organic ammoniums. Specific example of the additional atomic group (—R—) include linear or branched alkylene groups having 1 to 12 carbon atoms; arylene groups such as a phenylene group and a naphthylene group; a carbonyl group; an imino group; an amido group; a sulphonyl group; an ester group; and an ether group. The additional atomic group may be a combination group of them.

As the dye, a dye having an anionic group is preferably used. Specific examples of the dye include azo dyes, triphenylmethane dyes, (aza)phthalocyanine dyes, xanthene dyes and anthrapyridone dyes.

[Resin]

The ink contains a resin. The resin has a glass transition temperature higher than the glass transition temperature of the polyolefin resin constituting the ink storage bag. The ink may contain a plurality of resins, and in such a case, at least one of the resins is required to have a glass transition temperature higher than the glass transition temperature of the polyolefin resin constituting the ink storage bag. The content (% by mass) of the resin in the ink is preferably 0.10% by mass or more to 20.00% by mass or less and more preferably 0.50% by mass or more to 15.00% by mass or less based on the total mass of the ink.

The resin can be added to an ink for (i) stabilizing the dispersion state of a pigment, or as a resin dispersant or an assistant therefor. The resin can also be added to an ink for (ii) improving various properties of an image to be recorded. Examples of the resin, in terms of structure, include a block copolymer, a random copolymer, a graft copolymer and combinations of them. The resin may be a water-soluble resin that can be dissolved in an aqueous medium or a resin particle that is dispersed in an aqueous medium. The resin particle does not necessarily contain a coloring material. The resin particle is preferably self-dispersible or dispersible without any resin dispersant.

In the present specification, the "water-soluble resin" is a resin that does not form a particle having such particle sizes as to be measurable by dynamic light scattering when the resin is neutralized with an equivalent amount of an alkali to the acid value thereof. Whether the resin is water-soluble can be determined by the following procedure. First, a resin is neutralized with an alkali (for example, sodium hydroxide or potassium hydroxide) in an amount corresponding to the acid value thereof to give a liquid containing the resin (resin solid content: 10% by mass). Next, the prepared liquid is diluted 10-fold (in terms of volume) with pure water to give a sample solution. The resin particle size in the sample solution is then measured by dynamic light scattering. When the particle having particle sizes is not observed, such a resin can be determined to be water-soluble. The conditions for the measurement can be as follows.

[Measurement Conditions]
SetZero: 30 seconds
Number of measurement: 3 times
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions and the like are not limited to the above.

The water-soluble resin preferably has an acid value of 100 mg KOH/g or more to 250 mg KOH/g or less. The resin constituting the resin particle preferably has an acid value of 5 mg KOH/g or more to 200 mg KOH/g or less. The water-soluble resin preferably has a weight average molecular weight of 3,000 or more to 15,000 or less. The resin constituting the resin particle preferably has a weight-average molecular weight of 1,000 or more to 2,000,000 or less and more preferably 250,000 or more to 550,000 or less. Specifically, the resin contained in the ink is preferably at least one of (1) a water-soluble resin having a weight-average molecular weight of 5,000 or more and (2) a resin particle. A water-soluble resin having a comparatively large weight-average molecular weight is unlikely to permeate into the polyolefin resin constituting the ink storage bag and thus is preferred. A resin particle is less likely to permeate into the polyolefin resin constituting the ink storage bag than a water-soluble resin and thus are preferred. The resin particle preferably has an average particle size (particle size at an accumulation volume of 50% ($D_{50}$)) of 100 nm or more to 500 nm or less as determined by dynamic light scattering method.

The resin contained in the ink preferably has a glass transition temperature of 0° C. or more to 100° C. or less. The difference between the glass transition temperature of the resin contained in the ink and the glass transition temperature of the polyolefin resin constituting the ink storage bag is preferably 5° C. or more. If the difference in glass transition temperature is less than 5° C., the effect of preventing a polyolefin resin from softening associated with a reduction in crystallinity may be reduced, and the improvement effect of the ink use-up property may be slightly reduced. The difference in glass transition temperature is preferably 300° C. or less and more preferably 200° C. or less.

The difference between the average SP of the resin contained in the ink and the SP of the polyolefin resin constituting the ink storage bag is preferably 2.0 $(cal/cm^3)^{1/2}$ or more. When the difference in SP is an appropriate value, the interaction between the resin contained in the ink and the polyolefin resin constituting the ink storage bag is suppressed. This can effectively prevent the resin in the ink from permeating into the polyolefin resin constituting the ink storage bag, and the ink use-up property can be further improved. The difference in SP is preferably 10.0 $(cal/cm^3)^{1/2}$ or less and more preferably 5.0 $(cal/cm^3)^{1/2}$ or less. The SP of the resin contained in the ink is preferably 9.0 $(cal/cm^3)^{1/2}$ or more to 12.0 $(cal/cm^3)^{1/2}$ or less.

Examples of the resin include acrylic resins, urethane resins and olefinic resins. Specifically, acrylic resins and urethane resins are preferred, and acrylic resins are more preferred.

The acrylic resin preferably has a hydrophilic unit and a hydrophobic unit as constitutional units. Specifically preferred is a resin having a hydrophilic unit derived from (meth)acrylic acid and a hydrophobic unit derived from at least one of a monomer having an aromatic ring and a (meth)acrylate monomer. Particularly preferred is a resin having a hydrophilic unit derived from (meth)acrylic acid and a hydrophobic unit derived from at least one monomer of styrene and α-methylstyrene. These resins are likely to interact with a pigment and thus can be preferably used as a resin dispersant for dispersing a pigment.

The hydrophilic unit is a unit having a hydrophilic group such as an anionic group. The hydrophilic unit can be formed by polymerizing a hydrophilic monomer having a hydrophilic group, for example. Specific examples of the hydrophilic monomer having a hydrophilic group include acidic monomers having a carboxylic acid group, such as (meth)acrylic acid, itaconic acid, maleic acid and fumaric acid and anionic monomers such as anhydrides and salts of these acidic monomers. Examples of the cation constituting a salt of an acidic monomer include a lithium ion, a sodium ion, a potassium ion, an ammonium ion and organic ammonium ions. The hydrophobic unit is a unit not having a hydrophilic group such as an anionic group. The hydrophobic unit can be formed by polymerizing a hydrophobic monomer not having a hydrophilic group such as an anionic group, for example. Specific examples of the hydrophobic monomer include monomers having an aromatic ring, such as styrene, α-methylstyrene and benzyl (meth)acrylate; and (meth)acrylate monomers such as methyl (meth)acrylate, butyl (meth)acrylate and 2-ethylhexyl (meth)acrylate.

The urethane resin can be prepared by reacting a polyisocyanate with a polyol, for example. The urethane resin may be prepared by further reacting a chain extender. Examples of the olefinic resin include polyethylene and polypropylene.

Properties of the resin contained in the ink can be determined by the following methods. An excess acid is added to an ink to precipitate a resin, and the resin is dried to give a measurement sample. The sample is analyzed by pyrolysis gas chromatography/mass analysis (Py-GC/MS) to determine the unit type of the resin contained in the ink. The measurement sample is dissolved in deuterated dimethyl sulfoxide to give a sample, and the sample was analyzed by nuclear magnetic resonance (NMR). From the resulting chemical shifts, the unit type can be determined, and from the integrated value ratio, the composition ratio of units can be determined. From the determined resin units and the composition ratio (in terms of mass), the SP of the resin can be determined using SPs (SPs determined by Fedors method) of the units derived from monomers. When the coloring material contained in the ink is a pigment, the ink is centrifuged, and the resulting supernatant liquid can be analyzed in a similar manner. The glass transition temperature of a resin can be determined by analyzing a similar measurement sample to above, with a differential scanning calorimeter (DSC). The weight-average molecular weight of a resin can be determined by analyzing a sample that is prepared by dissolving, in tetrahydrofuran, a similar measurement sample to above, by gel permeation chromatography (GPC) in terms of polystyrene.

Table 1 shows various physical properties of typical monomers. Each glass transition temperature Tg (° C.) shown in Table 1 is determined by using a homopolymer of a monomer in accordance with JIS K 6240: 2011 with a differential scanning calorimeter (DSC). The glass transition temperature of a resin can be determined by the above method or can be determined from glass transition temperatures of monomers shown in Table 1 and a composition ratio (in terms of mass) in accordance with Fox equation. Each SP shown in Table 1 is determined by using a unit derived from a monomer by Fedors method. The SP of a resin can be determined from SPs of units derived from monomers shown in Table 1 and a composition ratio (in terms of mass).

TABLE 1

| Properties of monomers | | | |
| --- | --- | --- | --- |
| Monomer | Abbreviation | Glass transition temperature Tg(° C.) | SP $(cal/cm^3)^{1/2}$ |
| Acrylic acid | AA | 106 | 12.7 |
| Methacrylic acid | MAA | 180 | 11.6 |
| Methyl acrylate | MA | 8 | 10.6 |
| Methyl methacrylate | MMA | 105 | 9.9 |
| Ethyl acrylate | EA | −22 | 10.2 |
| Ethyl methacrylate | EMA | 65 | 9.7 |
| n-Butyl acrylate | nBA | −54 | 9.8 |
| n-Butyl methacrylate | nBMA | 20 | 9.4 |
| 2-Ethylhexyl acrylate | 2EHA | −85 | 9.2 |
| 2-Ethylhexyl methacrylate | 2EHMA | −9 | 9.0 |
| Lauryl acrylate | LA | 15 | 9.2 |
| Lauryl methacrylate | LMA | −65 | 9.0 |
| Benzyl acrylate | BzA | 9 | 11.2 |
| Benzyl methacrylate | BzMA | 54 | 10.8 |
| Styrene | St | 100 | 10.6 |
| a-Methylstyrene | αMSt | 170 | 10.1 |

[Aqueous Medium]

The ink used in the ink tank of the present invention is an aqueous ink containing at least water as an aqueous medium. The ink can contain water or an aqueous medium as a mixed solvent of water and a water-soluble organic solvent. As the water, deionized water or ion-exchanged water is preferably used. In the aqueous ink, the content (% by mass) of water is preferably 50.00% by mass or more to 95.00% by mass or less based on the total mass of the ink. In the aqueous ink, the content (% by mass) of a water-soluble organic solvent is preferably 3.00% by mass or more to 50.00% by mass or less based on the total mass of the ink. As the water-soluble organic solvent, any solvent usable in ink jet inks, such as alcohols, (poly) alkylene glycols, glycol ethers, nitrogen-containing compounds and sulfur-containing compounds, can be used.

[Additional Additive]

The ink may contain, in addition to the above components, various additives such as a surfactant, an antifoaming agent, a pH adjuster, a viscosity modifier, an anticorrosive, an antiseptic agent, an antifungal agent, an antioxidant and a reduction inhibitor, as needed.

<Ink Jet Recording Apparatus>

An ink jet recording apparatus of the present invention includes the above ink tank and a recording head that ejects an ink supplied from the ink tank by an ink jet method. The ink jet recording apparatus of the present invention will next be described with reference to drawings.

Figure 7:
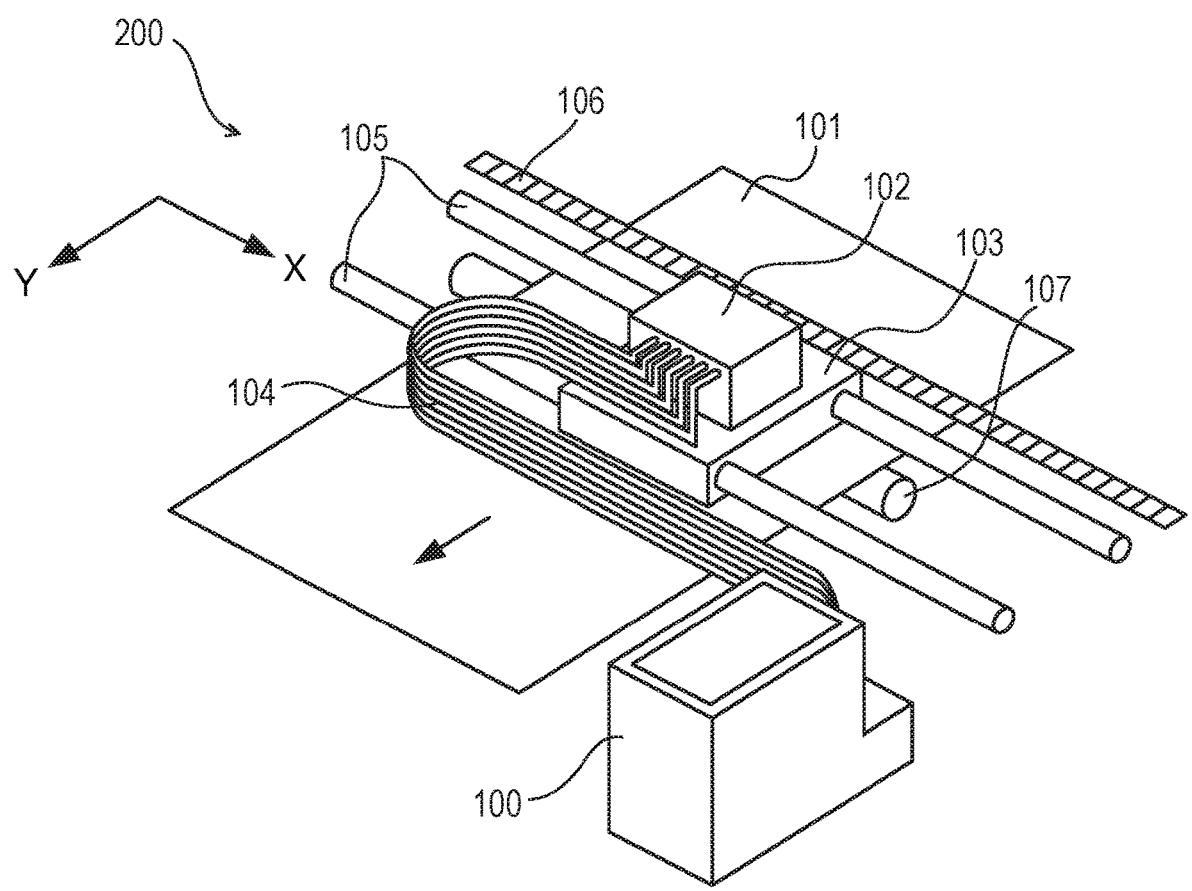
FIG. 7 is a perspective view schematically showing an embodiment of an ink jet recording apparatus of the present invention.

FIG. 7 is a perspective view schematically showing an embodiment of the ink jet recording apparatus of the present invention. An ink jet recording apparatus 200 of the embodiment shown in FIG. 7 is what is called a serial-type ink jet recording apparatus that records images by reciprocating scanning of a recording head in the X direction (main scanning direction). A recording medium 101 is intermittently conveyed in the Y direction (sub scanning direction) by a conveyor roller 107. A carriage 103 is supported in such a way as to be movable along guide rails 105 placed along the X direction and is fixed to an endless belt 106 that moves in parallel with the guide rails 105. The endless belt 106 is reciprocated by the driving force of a motor. The carriage 103 is reciprocated and swept in the X direction by the reciprocation of the endless belt 106.

A recording unit 102 installed on the carriage 103 is also reciprocated and swept in the X direction (main scanning direction). By the conveyance of the recording medium 101 in the Y direction and the reciprocating scanning of the recording unit 102 in the X direction, recording is performed. An ink is supplied from an ink tank 100 through an ink supply tube 104 to the recording unit 102. Subsequently, the ink is ejected from an ejection orifice of a recording head provided on the recording unit 102. The ink jet recording apparatus of the present invention is applicable to various systems including a full-line system and a serial scan system.

EXAMPLES

The present invention will next be described in further detail with reference to examples, comparative examples and reference examples, but the invention is not intended to be limited to the following examples without departing from the scope of the invention. Component amounts with "part" or "%" are based on mass unless otherwise noted.

<Production of Ink Tank Main Body>

An ink storage bag prepared by blow molding (a base area of 20 $cm^2$, a height of 16 cm, a capacity of 320 mL) was placed in a polyethylene housing, giving ink tank main bodies 1 to 15 having structures shown in Table 2. Various physical properties were determined using a sample prepared by cutting out a produced ink storage bag into an appropriate size. The glass transition temperature of a resin was determined by using a differential scanning calorimeter (trade name "DSC Q1000", manufactured by TA instruments). The SP of a resin was determined using an analyzed composition by Fedors method. The elastic modulus of an ink storage bag was determined using a strip-shaped sample 150 mm×25 mm in size that was prepared by cutting out the ink storage bag. The measurement was performed by using a tension tester (trade name "Autograph AGS-X", manufactured by Shimadzu Corporation) in the following conditions: test mode, tension; chuck distance, 100 mm; and displacement speed, 5 mm/min.

TABLE 2

Structures of ink tank main body

| Ink tank main body | Schematic design | Pressure regulatory mechanism | Shrinkage control mechanism | Housing material | Ink storage bag Material | Resin glass transition temperature (° C.) | Resin SP $(cal/cm^3)^{1/2}$ | Elastic modulus $(N/mm^2)$ | Shape |
|---|---|---|---|---|---|---|---|---|---|
| 1 | FIGS. 1A to 1C | Without | Without | PE | PE | −125 | 8.6 | 100 | Cylindrical |
| 2 | FIGS. 1A to 1C | Without | Without | PE | PP | 0 | 8.0 | 100 | Cylindrical |
| 3 | FIGS. 1A to 1C | Without | Without | PE | PE | −125 | 8.6 | 100 | Prismatic |
| 4 | FIGS. 1A to 1C | Without | Without | PE | PP | 0 | 8.6 | 100 | Prismatic |
| 5 | FIGS. 1A to 1C | Without | Without | PE | PE | −125 | 8.6 | 50 | Cylindrical |
| 6 | FIGS. 1A to 1C | Without | Without | PE | PE | −125 | 8.6 | 500 | Cylindrical |
| 7 | FIGS. 1A to 1C | Without | Without | PE | PE | −125 | 8.6 | 520 | Cylindrical |
| 8 | FIGS. 1A to 1C | Without | Without | PE | PP | 0 | 8.6 | 50 | Cylindrical |
| 9 | FIGS. 1A to 1C | Without | Without | PE | PP | 0 | 8.6 | 500 | Cylindrical |
| 10 | FIGS. 1A to 1C | Without | Without | PE | PP | 0 | 8.6 | 520 | Cylindrical |
| 11 | FIGS. 1A to 1C | Without | Without | PE | PET | 70 | 12.4 | 100 | Cylindrical |
| 12 | FIGS. 2A and 2B | Positive pressure | Without | PE | PP | 0 | 8.0 | 100 | Cylindrical |
| 13 | FIGS. 3A and 3B | Negative pressure | Without | PE | PP | 0 | 8.0 | 100 | Cylindrical |
| 14 | FIGS. 4A1, 4A2 and 4B | Without | With | PE | PP | 0 | 8.0 | 100 | Cylindrical |
| 15 | FIGS. 5A1, 5A2 and 5B | Without | With | PE | PP | 0 | 8.0 | 100 | Cylindrical |

PE: polyethylene,
PP: polypropylene,
PET: polyethylene terephthalate

<Synthesis of Resins>

(Resins 1 to 13)

In a four-necked flask equipped with a stirrer, a reflux condenser and a nitrogen inlet tube, 100.0 parts of ethylene glycol monobutyl ether was placed, and then a nitrogen gas was introduced into the reaction system. The solvent was stirred and heated to 110° C. Into the flask, a solution of a monomer (abbreviations are shown in Table 1) mixture shown in Table 3 and 1.3 parts of t-butyl peroxide (polymerization initiator) in ethylene glycol monobutyl ether was added dropwise over 3 hours. After aging for 2 hours, the ethylene glycol monobutyl ether was removed under reduced pressure, giving a solid resin. To the obtained resin, an equivalent molar amount of potassium hydroxide to the acid value thereof and an appropriate amount of ion-exchanged water were added, and the resin is dissolved at 80°

C., giving aqueous solutions of resins 1 to 13 having a resin content (solid content) of 20.0%. Each of the resins 1 to 13 was a water-soluble resin.

The resin particle 1 had a glass transition temperature of 70° C., a weight-average molecular weight of 400,000 and an SP of 10.7 $(cal/cm^3)^{1/2}$.

TABLE 3

Synthetic conditions and properties of resins 1 to 13

| | | | | | | Properties | | |
|---|---|---|---|---|---|---|---|---|
| | Monomer (parts) | | | | | Glass transition temperature | Weight-average molecular | SP |
| Resin | St | nBA | BzMA | AA | MAA | (° C.) | weight | $(cal/cm^3)^{1/2}$ |
| 1 | 65.0 | 13.0 | | 22.0 | | 70 | 7,000 | 11.0 |
| 2 | 78.0 | | | 22.0 | | 101 | 7,000 | 11.1 |
| 3 | | 40.0 | 38.0 | 22.0 | | 7 | 7,000 | 10.8 |
| 4 | | | 78.0 | 22.0 | | 64 | 7,000 | 11.2 |
| 5 | 75.0 | | | | 25.0 | 117 | 7,000 | 10.9 |
| 6 | 20.0 | 58.0 | | 22.0 | | −7 | 7,000 | 10.6 |
| 7 | 28.0 | 50.0 | | 22.0 | | 4 | 7,000 | 10.7 |
| 8 | 29.0 | 49.0 | | 22.0 | | 5 | 7,000 | 10.7 |
| 9 | 8.0 | 72.0 | | 20.0 | | −28 | 7,000 | 10.4 |
| 10 | 25.0 | 55.0 | | 20.0 | | −3 | 7,000 | 10.6 |
| 11 | 65.0 | 13.0 | | 22.0 | | 70 | 4,000 | 11.0 |
| 12 | 65.0 | 13.0 | | 22.0 | | 70 | 5,000 | 11.0 |
| 13 | 68.0 | 10.0 | | 22.0 | | 77 | 7,000 | 11.0 |

(Resin Particle 1)

A four-necked flask equipped with a stirrer, a reflux condenser and a nitrogen inlet tube was prepared. In the flask, 0.3 parts of sodium lauryl sulfate (emulsifier), 65.6 parts of benzyl methacrylate, 28.0 parts of methyl methacrylate, 6.4 parts of acrylic acid and 100.0 parts of ion-exchanged water were placed, and the contents were emulsified. Into the flask, 10.0 parts of 5% aqueous potassium persulfate solution was added dropwise over 3 hours. After aging for 2 hours, an appropriate amount of ion-exchanged water was added to give an aqueous dispersion of resin particle 1 having a resin content (solid content) of 20.0%.

<Preparation of Ink>

Components (unit: %) shown in Table 4 were mixed and thoroughly stirred, and each mixture was subjected to pressure filtration through a membrane filter with a pore size of 1.2 μm (trade name "HDCII Filter", manufactured by Pall), giving an ink. "Acetylenol E100" is the trade name of a surfactant manufactured by Kawaken Fine Chemicals.

TABLE 4

Compositions and properties of inks

| | Ink | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| C.I. Acid Red 289 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Aqueous solution of resin 1 | 25.0 | | | | | 20.0 | 20.0 | | | | | | | | | | |
| Aqueous solution of resin 2 | | 25.0 | | | | | | | | | | | | | | | |
| Aqueous solution of resin 3 | | | 25.0 | | | 5.0 | | | | | | | | | | | |
| Aqueous solution of resin 4 | | | | 25.0 | | | | | | | | | | | | | |
| Aqueous solution of resin 5 | | | | | 25.0 | | | | | | | | | | | | |
| Aqueous solution of resin 6 | | | | | | 5.0 | | | | | | | | | 25.0 | | |
| Aqueous solution of resin 7 | | | | | | | 25.0 | | | | | | | | | | |
| Aqueous solution of resin 8 | | | | | | | | 25.0 | | | | | | | | | |
| Aqueous solution of resin 9 | | | | | | | | | 25.0 | | | | | | | | |
| Aqueous solution of resin 10 | | | | | | | | | | 25.0 | | | | | | | |
| Aqueous solution of resin 11 | | | | | | | | | | | 25.0 | | | | | | |
| Aqueous solution of resin 12 | | | | | | | | | | | | 25.0 | | | | | |
| Aqueous solution of resin 13 | | | | | | | | | | | | | | | | 25.0 | |
| Aqueous dispersion of resin particle 1 | | | | | | | | | | | | | 25.0 | | | | |
| Glycerol | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Acetylenol E100 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Ion-exchanged water | 51.0 | 51.0 | 51.0 | 51.0 | 51.0 | 51.0 | 51.0 | 51.0 | 51.0 | 51.0 | 51.0 | 51.0 | 51.0 | 51.0 | 51.0 | 51.0 | 76.0 |

<Evaluation>

In accordance with a combination of an ink tank main body and an ink shown in left columns in Table 5, the ink tank main body was filled with the ink to prepare an ink tank. The amount of the ink loaded was 95% of the maximum ink capacity of the ink tank main body. The prepared ink tank was stored 10 cycles where a cycle was "storage at 70° C. for 3 hours and at −30° C. for 3 hours". The ink tank was allowed to stand at 25° C. for a day and then was installed in an ink jet recording apparatus having the principal part shown in FIG. 7. The ink was continuously ejected at a temperature condition of 25° C. until the ink was not supplied. The remaining amount of the ink when the ink supply was stopped was determined. The "ink consumption rate (%)" was calculated in accordance with Expression (2), and the ink use-up property was evaluated on the basis of the following criteria. The results are shown in Table 5.

$$\text{Ink consumption rate (\%)} = \{(X-Y)/X\} \times 100 \quad (2)$$

X: The amount of an ink charged in an ink tank main body (g)
Y: The remaining amount of an ink when the ink supply was stopped (g)
[Criteria]
A: The ink consumption rate was 90% or more.
B: The ink consumption rate was 80% or more to less than 90%.
C: The ink consumption rate was 70% or more to less than 80%.
D: The ink consumption rate was less than 70%.

TABLE 5

Evaluation conditions and evaluation results

| | | Ink tank | | Evaluation result (ink use-up property) |
|---|---|---|---|---|
| | | Ink tank main body | Ink | |
| Example | 1 | 1 | 1 | A |
| | 2 | 2 | 1 | A |
| | 3 | 1 | 2 | A |
| | 4 | 1 | 3 | A |
| | 5 | 1 | 4 | A |
| | 6 | 1 | 5 | A |
| | 7 | 1 | 6 | A |
| | 8 | 1 | 7 | A |
| | 9 | 2 | 2 | A |
| | 10 | 2 | 3 | A |
| | 11 | 2 | 4 | A |
| | 12 | 2 | 5 | A |
| | 13 | 2 | 6 | A |
| | 14 | 2 | 7 | A |
| | 15 | 2 | 8 | B |
| | 16 | 2 | 9 | A |
| | 17 | 1 | 10 | B |
| | 18 | 1 | 11 | A |
| | 19 | 1 | 12 | B |
| | 20 | 1 | 13 | A |
| | 21 | 1 | 14 | A |
| | 22 | 2 | 12 | B |
| | 23 | 2 | 13 | A |
| | 24 | 2 | 14 | A |
| | 25 | 3 | 1 | B |
| | 26 | 4 | 1 | B |
| | 27 | 5 | 1 | A |
| | 28 | 6 | 1 | A |
| | 29 | 7 | 1 | B |
| | 30 | 8 | 1 | A |
| | 31 | 9 | 1 | A |
| | 32 | 10 | 1 | B |
| Comparative Example | 1 | 11 | 15 | D |
| | 2 | 2 | 16 | D |
| Reference Example | 1 | 12 | 16 | A |
| | 2 | 13 | 16 | A |
| | 3 | 14 | 16 | A |
| | 4 | 15 | 16 | A |
| | 5 | 2 | 17 | C |

Each ink tank of Comparative Examples 1 and 2 caused obstruction at a plurality of positions in the ink storage bag at the time of recording completion, and a sufficient amount of the ink was failed to be supplied. Each ink tank of Reference Examples 1 and 2 had a pressure regulatory mechanism, and thus the ink was used up. Each ink tank of Reference Examples 3 and 4 had a shrinkage control mechanism, and thus the ink was used up.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-200731, filed Oct. 17, 2017, and Japanese Patent Application No. 2018-179947, filed Sep. 26, 2018, which are hereby incorporated by reference herein in their entirety.

What is claimed is:

1. An ink tank for an ink jet recording apparatus, the ink tank comprising:
an ink storage bag storing an ink therein, the ink storage bag having a side wall portion and being configured to cause the side wall portion to shrink as the ink flows out, wherein
the side wall portion is not configured to shrink into a predetermined shape,
the ink tank has no mechanism for adjusting a pressure in the ink storage bag,
the ink storage bag is made from a polyolefin resin,
the ink is an aqueous ink containing a coloring material and a resin, and
the resin contained in the ink has a glass transition temperature higher than a glass transition temperature of the polyolefin resin constituting the ink storage bag.

2. The ink tank according to claim 1, wherein a difference between the glass transition temperature of the resin contained in the ink and the glass transition temperature of the polyolefin resin constituting the ink storage bag is 5° C. or more.

3. The ink tank according to claim 2, wherein the difference between the glass transition temperature of the resin contained in the ink and the glass transition temperature of the polyolefin resin constituting the ink storage bag is 300° C. or less.

4. The ink tank according to claim 1, wherein a difference between an average SP of the resin contained in the ink and an SP of the polyolefin resin constituting the ink storage bag is 2.0 $(cal/cm^3)^{1/2}$ or more.

5. The ink tank according to claim 4, wherein the difference between the average SP of the resin contained in the ink and the SP of the polyolefin resin constituting the ink storage bag is 10.0 $(cal/cm^3)^{1/2}$ or less.

6. The ink tank according to claim 1, wherein the resin contained in the ink is at least one of a water-soluble resin having a weight-average molecular weight of 5,000 or more and a resin particle.

7. The ink tank according to claim 1, wherein the ink storage bag has an elastic modulus of 500 $N/mm^2$ or less.

8. The ink tank according to claim 7, wherein the ink storage bag has an elastic modulus of 50 $N/mm^2$ or more.

9. The ink tank according to claim 1, wherein the ink storage bag has a cylindrical shape.

10. An ink jet recording apparatus comprising:
the ink tank according to claim 1; and
a recording head configured to eject an ink supplied from the ink tank by an ink jet method.

11. The ink tank according to claim 1, wherein the side wall portion of the ink bag shrinks irregularly as the ink flows out.

12. The ink tank according to claim 1, wherein the side wall portion of the ink bag shrinks isotropically as the ink flows out.

13. The ink tank according to claim 1, wherein the polyolefin resin comprises a polyethylene resin.

14. The ink tank according to claim 1, wherein the polyolefin resin comprises a filler.

15. The ink tank according to claim 1, wherein the ink storage bag is made from a single layer of the polyolefin resin.

16. The ink tank according to claim 1, wherein an ink capacity of the ink storage bag is 100 to 1,000 mL.

17. The ink tank according to claim 1, wherein the ink storage bag is produced by a blow molding.

18. The ink tank according to claim 1, wherein the resin contained in the ink comprises an acrylic resin.

* * * * *